United States Patent [19]
Moon

[11] Patent Number: 5,881,114
[45] Date of Patent: Mar. 9, 1999

[54] ERROR DETECTING CIRCUIT OF A SYSTEM TIME CLOCK FOR AN MPEG SYSTEM DECODER

[75] Inventor: Byung-Joon Moon, Kyungki-do, Rep. of Korea

[73] Assignee: Samsung Electronics Co., Ltd., Kyungki-Do, Rep. of Korea

[21] Appl. No.: 735,341

[22] Filed: Oct. 22, 1996

[30] Foreign Application Priority Data

Oct. 24, 1995 [KR] Rep. of Korea .................. 1995-36804

[51] Int. Cl.$^6$ ...................................... H03D 3/24
[52] U.S. Cl. .......................... 375/376; 375/376; 375/359; 375/368; 370/253
[58] Field of Search ..................... 375/376, 359, 375/368; 348/512, 515, 465, 396; 370/395, 522, 253; 371/47.1

[56] References Cited

U.S. PATENT DOCUMENTS

| | | | |
|---|---|---|---|
| 5,467,342 | 11/1995 | Logston et al. | 370/17 |
| 5,598,352 | 1/1997 | Rosenan et al. | 364/514 A |
| 5,623,311 | 4/1997 | Phillips et al. | 348/396 |
| 5,699,392 | 12/1997 | Dokic | 375/376 |

Primary Examiner—Stephen Chin
Assistant Examiner—Shu Wang Liu
Attorney, Agent, or Firm—Sughrue, Mion, Zinn, Macpeak & Seas, PLLC

[57] ABSTRACT

An error detecting circuit of a system time clock is described, which includes a counter section for counting the pulses of the system time clock and resetting the count value at every given period, an error generating section for generating an error value, a loop filter for outputting a voltage value in accordance with the error value, and a voltage controlled oscillator for providing a clock signal corresponding to the voltage value from the loop filter. The frequency of a system time clock of a decoder is modified in accordance with the difference of the system time clock of the decoder from that of an encoder, thereby synchronizing the system time clocks of the decoder and the encoder.

9 Claims, 3 Drawing Sheets

B : PCR−STC<0

A : PCR−STC>0

B : PCR−STC>0

A : PCR−STC<0

ERROR DETECTING CIRCUIT OF A SYSTEM TIME CLOCK FOR AN MPEG SYSTEM DECODER

BACKGROUND OF THE INVENTION (1) Field of the Invention

The present invention relates to an error detecting circuit of a system time clock (STC), and more particularly, to an error detecting circuit of a system time clock for a moving picture experts group 2 (MPEG2) system decoder.

(2) Description of the Prior Art

In view of the current technical trend toward digitalizing information, an image compression technology is important as a basis for the development of multimedia technology.

Under these technical environments, and in view of the fact that an international standard for compressing a digital signal of a moving picture image is essential in the field of multimedia, a moving picture experts group (MPEG) standard has developed as an international standard.

The MPEG standard relates to video and audio systems wherein a digital video signal is compressed using an MPEG standardized video algorithm, a digital audio signal is compressed using an MPEG standardized audio algorithm, and synchronizing and multiplexing the bit stream of compressed video and audio signals.

The MPEG has the basic frame compression features of the joint photograph experts group (JPEG) standard, but has an additional function of deleting time duplexity among frames. The JPEG standard is one of the proposed standards in the technology of static picture compressing. The MPEG-2 standard is prominent among MPEG standards, and is capable of providing a high resolution image at the level of high definition television (HDTV). Accordingly, many technical developments are currently directed to MPEG-2 systems and decoder chips for MPEG-2 video/audio systems.

The present invention specifically relates to an MPEG-2 system decoder.

According to international standard draft no. 13818 prepared by International Standard Organization(ISO)/International Electrotechnical Conference(IEC), synchronizing each elementary stream in a transport stream is carried out on the basis of a program clock reference(PCR) and a system time clock(STC).

The system time clock is obtained by means of a counter which counts a clock signal of a certain frequency, for example, 27 MHz. The STC is used on both an encoder side and a decoder side of a transport stream, and the STC of an encoder is required to be synchronized with the STC of a decoder.

In order to satisfy this requirement, the STC values of an encoder are sampled out as PCRs at constant time intervals, which are then transferred through the transport stream.

On the decoder side of the transport stream, the STC of a decoder is synchronized with the STC of an encoder by means of the PCRs which are transferred as described above.

For the purpose of the synchronizing operation, there should be provided an error detecting circuit on the decoder side, by which an error is detected between a current STC and the PCR from the transport stream and then the STC of the decoder is revised with reference to the error.

SUMMARY OF THE INVENTION

It is an object of the present invention to provide an error detecting circuit, which detects the difference between a system time clock (STC) of a decoder and a program clock reference (PCR) from a transport stream, and then causes the STC to be revised, thereby synchronizing the STC of the decoder with the STC of an encoder.

To achieve the above-mentioned object, the present invention includes:

a counter section for receiving the STC of a decoder, for counting the STC, and for resetting the count value at every fixed period;

an error generating section for receiving the PCR obtained by periodical sampling of count values from the STC of an encoder, for evaluating the difference of each PCR received from the count value of the counter section, and for generating and outputting an error value in accordance with the difference;

a loop filter for providing a voltage which corresponds to the error value from the error generating section; and a voltage controlled oscillator for receiving the voltage from the loop filter, thereafter generating a clock signal having a frequency corresponding to the voltage, the clock signal being an STC of a decoder.

According to the configuration of the present invention as described above, the loop filter and the voltage controlled oscillator constitute a phase-locked loop (PLL) which controls the frequency of the STC in accordance with the error value from the error generating section.

DETAILED DESCRIPTION OF THE PREFERRED EMBODIMENTS

Preferred embodiments of the present invention are described below with reference to the accompanying drawings.

Figure 1:
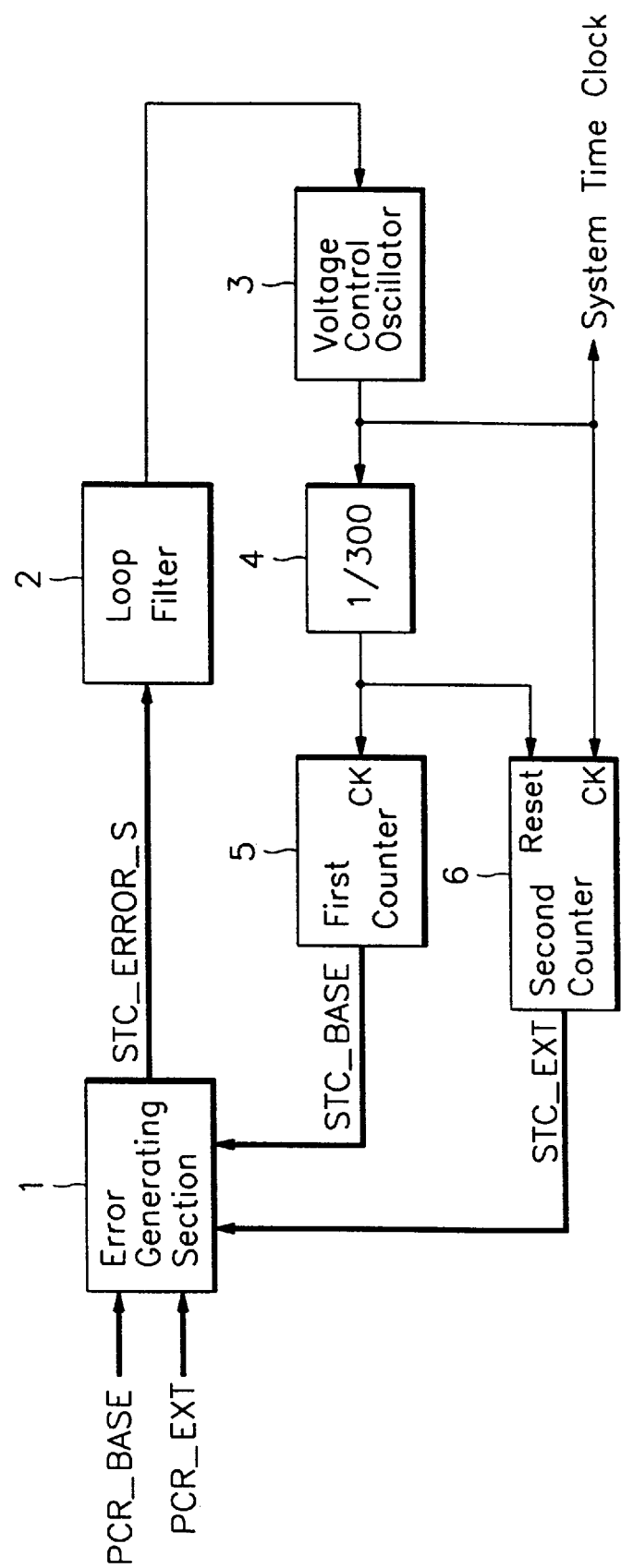
FIG. 1 is a block diagram according to a preferred embodiment of the present invention.

As shown in FIG. 1, an error detecting circuit of a system time clock (STC) for an MPEG system decoder according to an embodiment of the present invention includes:

an error generating section 1 for receiving program clock reference values (PCR_BASE, PCR_EXT) and system time clock count values (STC_BASE, STC_EXT), and outputting a system time clock error value (STC_ERROR_S);

a loop filter 2 connected to an output terminal of the error generating section 1;

a voltage controlled oscillator 3 which receives outputs from the loop filter 2 and thereby provides an STC;

a frequency divider 4 which is connected to the output terminal of the voltage controlled oscillator 3;

a first counter 5 for receiving a signal from the frequency divider 4 into a clock terminal (CK) and thereby outputting a system time clock count value (STC_BASE) to the error generating section 1; and a second counter 6 for receiving a signal from the frequency divider 4 into a reset terminal (Reset) and thereby outputting a system time clock count value (STC_EXT) to the error generating section 1.

As described above, the system time clock count values comprise a basic value (STC_BASE) and an extended value (STC_EXT), and in the same manner, the program clock reference values comprise a base value (PCR_BASE) and an extension value (PCR_EXT).

The first counter 5 is a 33 bit counter, while the second counter 6 is a 9 bit counter. The dividing ratio of the frequency divider 4 is 1/300.

The program clock reference values (PCR_BASE, PCR_EXT), which are transferred into the error generating section 1, are obtained by means of sampling out count values of an STC of an encoder. The PCR at this situation can be expressed by the following equation.

$$PCR=PCR\_BASE \times 300 + PCR\_EXT$$

As shown in FIG. 1, the STC of a decoder and a clock from the frequency divider are counted by the first counter 5 and the second counter 6, which in turn outputs system time clock count values (STC_BASE) and (STC_EXT) respectively.

When the power for the circuit is turned on to initiate operation of the circuit, an initial PCR base value and an initial PCR extension value are loaded, and the count operation being initiated proceeds from those values.

The count values from the first counter 5 and the second counter 6 are inputted to the error generating section 1 in continuous mode. When the PCR is inputted to the error generating section 1 in accordance with a predetermined sampling period, the difference between a basic value and an extended value is obtained from the inputted PCR and the count value of the STC. In the error to generating section 1, an error value (STC_ERROR_S) of the STC and PCR is generated by comparing and determining the difference between the basic value and extended value, which then is transferred into the loop filter 2.

In the loop filter 2, a voltage value is obtained in accordance with the error value (STC_ERROR_S), which in turn is transferred into the voltage controlled oscillator 3.

In the voltage controlled oscillator 3, a clock signal of the frequency corresponding to the inputted voltage is generated which is outputted as an STC of an encoder.

Referring to the above-described embodiment of the present invention, an error value is obtained by comparing the PCR as a count value of the STC of an encoder with the count value of the STC of a decoder, the frequency of the STC of the decoder being modified according to the difference so that the STC of the decoder is synchronized with the STC of the encoder.

The error generating section 1, the first counter 5, and the second counter 6 are described with reference to the FIGS. 2, 3, and 4 as follows.

Figure 2:
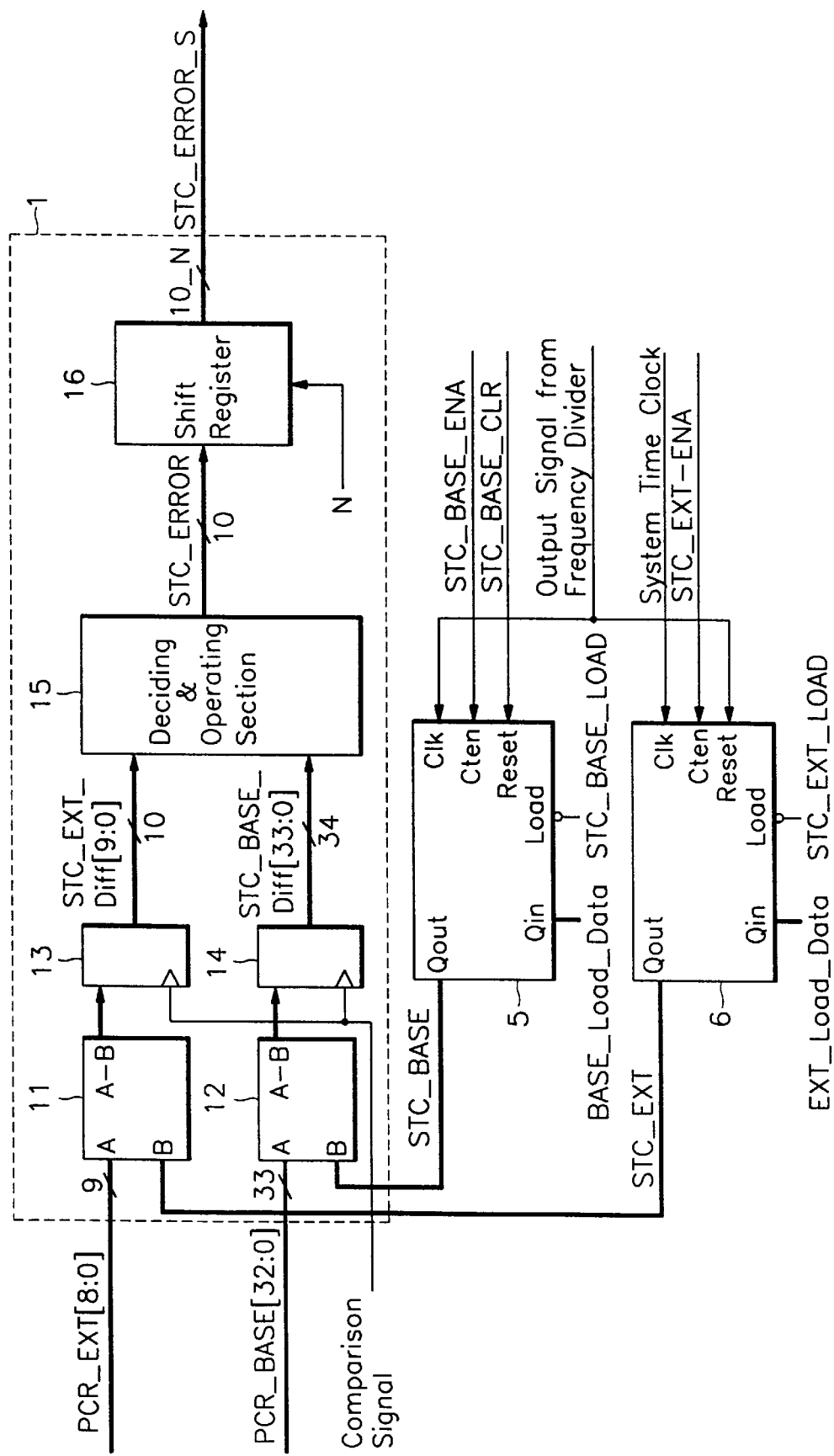
FIG. 2 is a detailed block diagram illustrating the error generating section and the first and second counter of FIG. 1.

As shown in FIG. 2, an error generating section 1 according to an embodiment of the present invention includes:

a subtracter 11 for receiving a 9 bit PCR extension value (PCR_EXT[8:0]) and a 9 bit STC count value (STC_EXT) from the second counter 6, outputting the difference of the two values;

another subtracter 12 for receiving a 33 bit PCR base value (PCR_BASE[32:0]) and a 33 bit STC count value (STC_BASE) from a is first counter 5, and outputting the difference of the two values;

a latch 13 for receiving a value from the subtracter 11 and a comparison signal, and outputting a 10 bit extension value difference (STC_EXT Diff[9:0]);

another latch 14 for receiving a value from the subtracter 12 and a comparison signal, and outputting a 34 bit base value difference (STC_BASE Diff[33:0]);

a deciding and operating section 15 for receiving values from the two latches 13 and 14, and outputting a 10 bit error signal (STC_ERROR); and a shift register 16 for receiving the error signal from the deciding and operating section 15, and outputting an N bit shifted error signal (STC_ERROR_S).

An output signal from the frequency divider 4 is inputted to a clock terminal (Clk) of the first counter 5, while an enable signal (STC_BASE_ENA) is inputted to a count enable terminal (Cten), a clear signal (STC_BASE_CLR) is inputted to a reset terminal (Reset), a base load data (BASE_Load_Data) is inputted to a data input terminal (Qin), and a load signal (STC_BASE_LOAD) is inputted to a load terminal (Load).

With regard to a second counter 6, a system time clock is inputted to a clock terminal (Clk), while an enable signal (STC_EXT_ENA) to a count enable terminal (Cten), an output signal from the frequency divider 4 to a reset terminal (Reset), an extension load data (EXT_Load_Data) to a data input terminal (Qin), and a load signal (STC_EXT_LOAD) to a load terminal (Load).

The operating features of the error generating section 1, the first counter 5, and the second counter 6 are described as follows.

When the power for the circuit is switched on to initiate its operation, each of the low level load signals (STC_BASE_LOAD) and (STC_EXT_LOAD) is inputted respectively to the load terminal (Load) of each counter 5 and 6, presetting each load data (BASE_Load_Data) and (EXT_Load_Data) into corresponding counter 5 and 6. The load data (BASE_Load_Data) and (EXT_Load_Data) are a PCR base value (PCR_BASE[32:0]) and a PCR extension value (PCR_EXT[8:0]) respectively, which are inputted to the decoder initially.

When the presetting is completed, each of the high level enable signals (STC_BASE_ENA) and (STC_EXT_ENA) is inputted respectively to the corresponding counters 5 and 6, and each counter starts counting the pulse of the clock signal to each clock terminal starting from the load data. In this state, the counter 6 resets the count values every 300 clocks of the system time clock as the output signals of the frequency divider have frequencies divided by 1/300 of the system time clock. The counter 5 resets the count values in a longer period than the reset period of the counter 6.

The count value (STC_BASE) from the counter 5 is inputted to the subtracter 12 and the count value (STC_EXT) from the counter 6 is inputted to the subtracter 11.

In the subtracter 11 the difference between a PCR extension value (PCR_EXT[8:0]) and a count value (STC_EXT) is obtained, and in the subtracter 12 the difference between a PCR base value (PCR_BASE[32:0]) and a count value (STC_BASE) is obtained.

Output signals from the subtracter 11 and 12 are inputted to corresponding latches 13 and 14, whereinto 1 bit comparison signals are commonly inputted. The comparison signal indicates incoming of new program clock references and each of latches 13 and 14 transfers input signals to an output terminal only when the input signals are high level comparison signals.

When the output data (STC_EXT Diff[9:0]) and (STC_BASE Diff[33:0]) from the latches 13 and 14 are inputted to the deciding and operating section 15, the deciding and operating section 15 generates a 10 bit error signal (STC_ERROR) by calculating the deviation of a PCR from an STC based on the difference between a base value and an extension value outputted from the latches 13 and 14.

The error signal (STC_ERROR) is shifted through the shift register 16 to the right by N bits and the shifted data (STC_EXT Diff[9:0]) is transferred to the loop filter 2.

Figure 3:
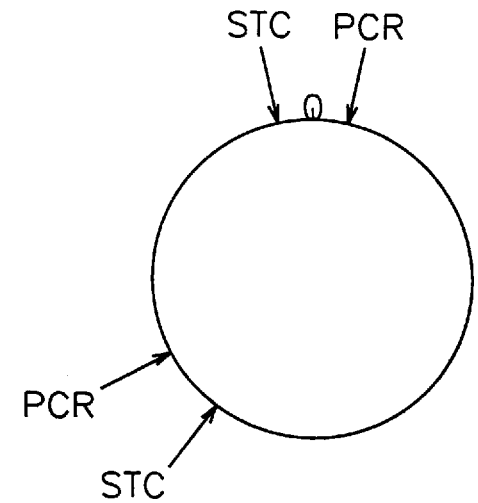
FIG. 3 is a diagram illustrating the relationship between a system time clock (STC) and a program clock reference (PCR) when the PCR precedes STC.
Figure 4:
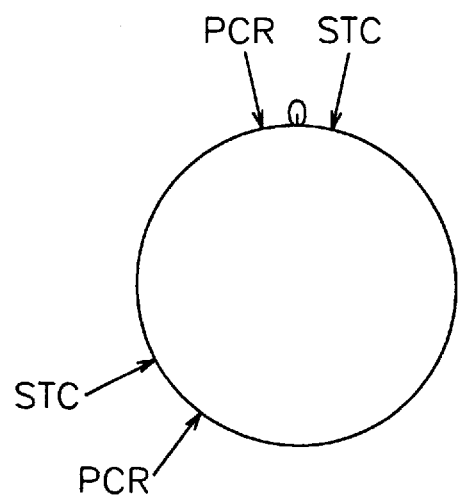
FIG. 4 is a diagram illustrating the relationship between the STC and the PCR when the STC precedes PCR.

As illustrated in FIGS. 3 and 4, the relationship between the PCR and the STC can be classified into the following three cases with reference to the input values to the deciding and operating section 15, (STC_EXT_Diff[9:0]) and (STC_BASE_Diff[33:0]).

In the first case, as shown in FIG. 3, the PCR precedes the STC of a decoder and the error signal (STC_ERROR) is outputted from the deciding and operating section 15 is a positive value.

In the second case, as shown in FIG. 4, the STC of a decoder precedes the PCR and the error signal (STC_ERROR) is outputted from the deciding and operating section 15 is a negative value.

In the third case, wherein the two input values to the deciding and operating section 15 are within the range of $\pm 300 \sim \pm(2^{33}-300)$, the phase-locked loop is regarded to be in an unlock state as the STC deviates greatly from the PCR, thereby '0' being outputted for the error signal (STC_ERROR).

The operating mode of the deciding and operating section 15 is described in the following using the differences of base and extension (STC_EXT_Diff[9:0], STC_I_BASE_Diff [33:0]) inputted thereto.

FIG. 3 illustrates that the value of PCR-STC can be positive such as in case A, or negative such as case B, even when the PCR precedes the STC.

There are three cases when the PCR precedes the STC by less than 300 clocks as follows:

1. STC_BASS_Diff[33:0]=0 and STC_EXT_Diff[9:0] is positive, such as case A in FIG. 3;
2. STC_BASE_Diff[33:0]=110 and STC_EXT_Diff [9:0] is negative, such as case B in FIG. 4;
3. STC_BASE_Diff[33:0]$\times -(2^{33}-1)_{10}$, that is, $10000000000000000000000000000001_2$, and STC_EXT_Diff[9:0] is negative, such as case B in FIG. 3; where STC_BASE_Diff[33:0]=PCR_BASE[32:0]—STC_BASE[32:0] and STC_EXT_Diff[9:0]=PCR_EXT[8:0]–STC_EXT[8:0], while the values of STC_BASE_Diff[33:0] and STC_EXT_Diff[9:0] are expressed in 2's compliment numbers whose most significant bit (MSB) is a sign bit.

The error signals (STC_ERROR) from the deciding and operating section 15 should have positive values with respect to the above-described cases. The error signals (STC_ERROR) corresponding to each case are as follows:

1. STC_EXT_Diff[9:0];
2. 300+STC_EXT_Diff[9:0]; and
3. 300+STC_EXT_Diff[9:0].

FIG. 4 illustrates that the value of PCR-STC can be negative such as in case A, or positive such as in case B, even when the STC precedes the PCR.

There are three cases when the STC precedes the PCR by less than 300 clocks as follows:

4. STC_BASE_Diff[33:0]=0 and STC_EXT_Diff [9:0]is negative, such as case A in FIG. 4;
5. STC_BASE_Diff[33:0]=$-1_{10}$, that is, $11111111111111111111111111111111_2$ and STC_EXT_Diff[9:0] is positive such as case A in FIG. 4; and
6. STC_BASE_Diff[33:0] $(2^{33}-1)_{10}$, that is, $01111111111111111111111111111111_2$ and STC_EXT_Diff[9:0] is positive such as case B in FIG. 4.

The error signals (STC_ERROR) from the deciding and operating section 15 should have negative values with respect to the abovedescribed cases. The error signals (STC_ERROR) corresponding to each case are as follows:

4. STC_EXT_Diff[9:0];
5. –(300–STC_EXT_Diff[9:0]); and
6. –(300–STC_EXT_Diff[9:0]).

The generating mode of error signals (STC_ERROR) from the deciding and operating section 15 is summarized in the following table.

| CASE | CONDITION | STC_ERROR |
|---|---|---|
| 1 | STC_BASE_Diff[33:0] = 0 & STC_EXT_Diff[9:0] is positive | STC_EXT_Diff[9:0] |
| 2 | STC_BASE_Diff[33:0] = $1_{10}$ & STC_EXT_Diff[9:0] is negative | 300 + STC_EXT_Diff[9:0] |
| 3 | STC_BASE_Diff[33:0] = $-(2^{33} - 1)_{10}$ & STC_EXT_Diff[9:0] is negative | 300 + STC_EXT_Diff[9:0] |
| 4 | STC_BASE_Diff[33:0] = 0 & STC_EXT_Diff[9:0] is negative | STC_EXT_Diff[9:0] |
| 5 | STC_BASE_Diff[33:0] = $-1_{10}$ & STC_EXT_Diff[9:0] is positive | –(300-STC_EXT_Diff[9:0]) |
| 6 | STC_BASE_Diff[33:0] = $-(2^{33} - 1)_{10}$ & STC_EXT_Diff[9:0] is positive | –(300-STC_EXT_Diff[9:0]) |
| 7 | Other than the above six cases | 0 |

The shift register 16, for varying the gain of the phase-locked loop, shifts output signals from the deciding and operating section 15 by N bits and acts as a controller of the dynamic range of error signals (STC_ERROR).

According to the above-described preferred embodiments, the present invention provides an error detecting circuit of a system time clock for an MPEG system decoder, which counts both a system time clock (STC) of a decoder and a program clock reference (PCR), obtains an error from the difference between the STC and the PCR at every fixed period of sampling, and then controls the frequency of the STC of a decoder to correspond to the error, thereby the STC of the decoder is synchronized with the STC of an encoder as a result.

What is claimed is:

1. An error detecting circuit of a system time clock for a moving picture experts group system decoder, comprising:
    a counter section for receiving the system time clock of the decoder, for counting the system time clock of the decoder, and for resetting the count value of the system clock of the decoder at every fixed period, thereby producing successive count values of the system clock of the decoder;

an error generating section for receiving a program clock reference obtained by periodical sampling of count values from a system time clock of an encoder, for evaluating a difference between each program clock reference and a corresponding one of the successive count values of the system clock of the decoder, and for generating and outputting an error value corresponding to the difference;

a loop filter for providing a voltage which corresponds to the error value from the error generating section; and a voltage controlled oscillator for receiving the voltage from the loop filter, thereafter generating a clock signal having a frequency which corresponds to the voltage, the clock signal being the system time clock of the decoder;

wherein said counter section comprises two counters for counting base and extension values of the system time clock and said error generating section receives the values of the base and extension of the system time clock from said two counters.

2. An error detecting circuit of claim 1, wherein said program clock reference, which is inputted to said error generating section, comprises a base value and an extension value.

3. An error detecting circuit of a system time clock for a moving picture experts group system decoder, comprising:

a counter section for receiving the system time clock of the decoder, for counting the system time clock of the decoder, and for resetting the count value of the system clock of the decoder at every fixed period, thereby producing successive count values of the system clock of the decoder, an error generating section for receiving a program clock reference obtained by periodical sampling of count values from a system time clock of an encoder, for evaluating a difference between each program clock reference and a corresponding one of the successive count values of the system clock of the decoder, and for generating and outputting an error value corresponding to the difference;

a loop filter for providing a voltage which corresponds to the error value from the error generating section; and a voltage controlled oscillator for receiving the voltage from the loop filter, thereafter generating a clock signal having a frequency which corresponds to the voltage, the clock signal being the system time clock of the decoder;

wherein said counter section comprises:

a frequency divider for receiving the system time clock of the decoder and outputting a ratio signal divided into a predetermined ratio;

a first counter having a first clock terminal for receiving the ratio signal from said frequency divider into said first clock terminal, counting the ratio signal starting from a first initial load data, and resetting a count value of the ratio signal at every predetermined period, thereby outputting a first counter count value; and a second counter having a second clock terminal for receiving the system time clock of the decoder into said second clock terminal and the ratio signal from said frequency divider into a reset terminal, counting the system time clock starting from a second initial load data, and resetting the count value of the system clock of the decoder at every said fixed period, thereby outputting a second counter count value.

4. An error detecting circuit of claim 3, wherein each of the successive count values of the system clock of the decoder outputted from said first counter is a base value of the system time clock of the decoder and the second counter count value outputted from said second counter is an extension value of the system time clock of the decoder.

5. An error detecting circuit of claim 3, wherein said first initial load data from said first counter is an initial value among base values of a program clock reference, and said second initial load data from said second counter is an initial value among extension values of the program clock reference.

6. An error detecting circuit of claim 3, wherein said error generating section comprises:

a first subtracter for receiving said second counter count value from said second counter and an extension value of the program clock reference, and outputting a difference between said second counter count values and the extension value of the program clock reference, and outputting a first subtraction signal;

a second subtracter for receiving said first counter count value from said first counter and a base value of the program clock reference, and outputting a difference between said first counter count value and base value of the program clock reference, and outputting a second subtraction signal;

a first latch for transmitting the first subtraction signal output by said first subtracter each time the program clock reference is received by said first error generating section;

a second latch for transmitting the second subtraction signal output by said second subtracter each time the program clock reference is received by said error generating section; and a deciding and operating section for receiving an extension difference value from said first latch, and for receiving a base difference value from said second latch, and outputting an error signal corresponding to a difference between the extension difference value and the base difference value.

7. An error detecting circuit of claim 6, further comprising a shift register connected to said deciding and operating section, said shift register receiving the error signal output by said deciding and operating section and shifting said error signal by a predetermined number of bits to generate a shifted error signal having a restricted dynamic range, and outputting said shifted error signal to said loop filter.

8. An error detecting circuit of claim 6, wherein the error signal output by said deciding and operating section is positive when the program clock reference precedes the system time clock of the decoder, and the error signal output by said deciding and operating section is negative when the system time clock of the decoder precedes the program clock reference, and outputs zero(0) as an error signal in all other cases.

9. An error detecting circuit of claim 6, wherein a comparison signal is input to said first latch for controlling the transmission of the first subtraction signal, and the comparison signal is input to said second latch for controlling the transmission of the second subtraction signal, the comparison signal having a frequency equal to the sampling period of the program clock reference.

* * * * *